United States Patent
Kendrick

(10) Patent No.: US 9,821,520 B2
(45) Date of Patent: Nov. 21, 2017

(54) HYBRID COMPOSITE-METAL SHAFT

(71) Applicant: Bell Helicopter Textron Inc., Fort Worth, TX (US)

(72) Inventor: Phillip A. Kendrick, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 0 days.

(21) Appl. No.: 14/662,406

(22) Filed: Mar. 19, 2015

(65) Prior Publication Data

US 2016/0271925 A1 Sep. 22, 2016

(51) Int. Cl.
| | |
|---|---|
| *B29C 70/00* | (2006.01) |
| *B29C 70/32* | (2006.01) |
| *B29C 70/44* | (2006.01) |
| *B29C 65/66* | (2006.01) |
| *B29C 65/00* | (2006.01) |
| *B64C 27/00* | (2006.01) |
| *B29L 31/00* | (2006.01) |
| *B29L 31/30* | (2006.01) |

(52) U.S. Cl.
CPC .......... *B29C 70/00* (2013.01); *B29C 65/665* (2013.01); *B29C 66/0224* (2013.01); *B29C 66/1122* (2013.01); *B29C 66/30325* (2013.01); *B29C 66/52272* (2013.01); *B29C 66/53241* (2013.01); *B29C 66/612* (2013.01); *B29C 66/721* (2013.01); *B29C 66/7394* (2013.01); *B29C 66/73755* (2013.01); *B29C 66/742* (2013.01); *B29C 70/32* (2013.01); *B29C 70/446* (2013.01); *B64C 27/00* (2013.01); *B29C 66/71* (2013.01); *B29C 66/72141* (2013.01); *B29C 66/74283* (2013.01); *B29L 2031/3088* (2013.01); *B29L 2031/75* (2013.01)

(58) Field of Classification Search
CPC ...................................................... B29C 70/00
USPC ............................... 156/80, 83–86, 293, 294
See application file for complete search history.

(56) References Cited

U.S. PATENT DOCUMENTS

| | | | | |
|---|---|---|---|---|
| 2,835,107 | A * | 5/1958 | Ward ................. | C04B 41/4811 |
| | | | | 138/DIG. 7 |
| 3,345,732 | A * | 10/1967 | Brower ................. | B21D 26/14 |
| | | | | 29/419.2 |
| 3,731,367 | A * | 5/1973 | Laussermair ......... | B29C 53/845 |
| | | | | 29/447 |
| 4,171,626 | A * | 10/1979 | Yates .................... | B29C 53/665 |
| | | | | 138/130 |
| 4,386,629 | A * | 6/1983 | Cook ...................... | F16L 47/22 |
| | | | | 138/103 |
| 4,605,385 | A * | 8/1986 | Puck ...................... | F16C 3/026 |
| | | | | 138/109 |

(Continued)

FOREIGN PATENT DOCUMENTS

EP 0009007 A1 * 3/1980

*Primary Examiner* — Jeffry H Aftergut

(57) ABSTRACT

A method for making a composite-metal hybrid shaft for a rotorcraft includes providing a tubular metal member that has an internal surface defining a space therein, preparing a composite member using a curing tool, curing the composite member, creating a cured composite member, expanding the metal member with heat, placing the cured composite member into the space defined by the internal surface of the expanded metal member, and allowing the expanded metal member to cool.

20 Claims, 3 Drawing Sheets

(56) References Cited

U.S. PATENT DOCUMENTS

| | | | | |
|---|---|---|---|---|
| 4,715,739 A | * | 12/1987 | Ruegg | F16C 3/026 |
| | | | | 285/381.2 |
| 6,716,148 B1 | * | 4/2004 | Fortin | B41F 31/26 |
| | | | | 29/895.22 |
| 7,938,628 B2 | * | 5/2011 | Lin | B64C 27/12 |
| | | | | 416/248 |
| 2009/0163291 A1 | * | 6/2009 | Chao | A63B 53/0466 |
| | | | | 473/342 |

* cited by examiner

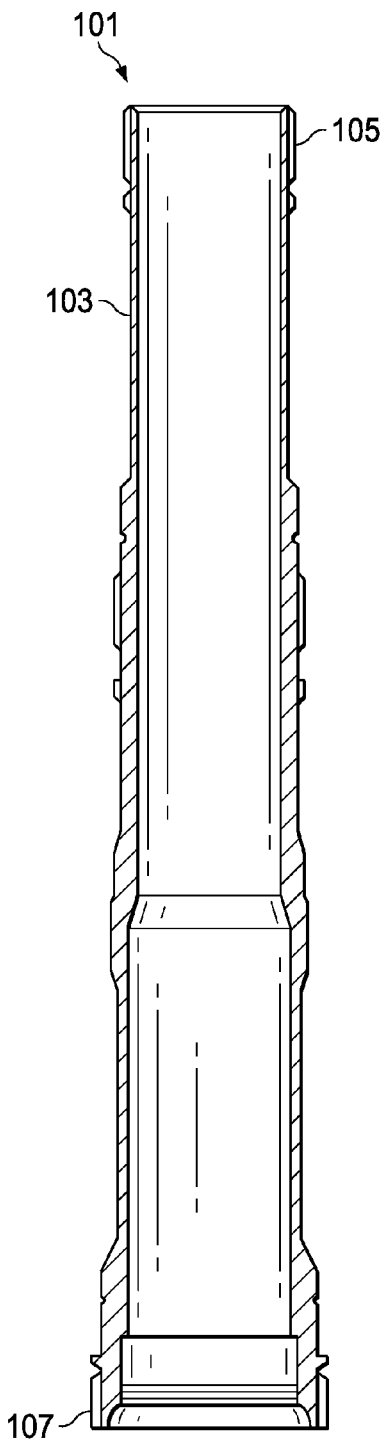
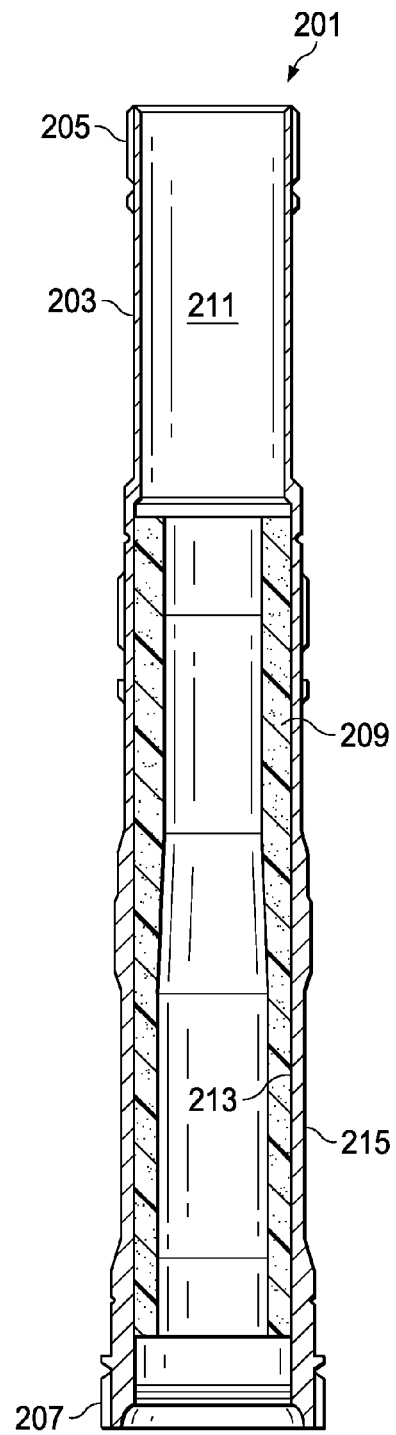
FIG. 1
(PRIOR ART)
FIG. 2

HYBRID COMPOSITE-METAL SHAFT

BACKGROUND

Technical Field

The present invention relates to shafts for rotorcraft.

Description of Related Art

Traditional rotorcraft masts are fabricated from a steel forging, which typically comprises 4340 steel, 9310 low-alloy steel, or nitriding steel, such as nitralloy steel. In another example embodiment, a rotorcraft mast can be fabricated from a titanium forging. All interfacing features are machined on the outside surface of the mast. These can include splines for engaging with a planetary carrier in the rotorcraft's gearbox and a trunnion of the rotor hub, bearing raceways, spinner support, etc.

For example, as shown in FIG. 1, a conventional steel mast 101 for a rotorcraft (not shown) can comprise an elongated tubular structure having an external wall 103 made of steel. Mast 101 can include one or more end fittings 105 and 107 that allow mast 101 to be connected to the transmission, the rotor hub, and other components of the rotorcraft (not shown).

A major section of the mast may be exposed to the environment with minimum protection outside of the gearbox. This section may be critically loaded and may be susceptible to a variety of potentially damaging elements, such as debris blasts, sand blasts, chemical corrosion, ballistic, and handling damage. All of these damaging elements may result in dangerous cracking on the mast surface. Because conventional masts are mission critical parts with no redundant or "fail-safe" structures, the failure of a mast could very likely result in the loss of life and/or property.

Although great strides have been made in the area of rotorcraft masts, significant shortcomings remain.

DESCRIPTION OF THE DRAWINGS

The novel features believed characteristic of the method and apparatus of the present disclosure are set forth in the appended claims. However, the method and apparatus, as well as a preferred mode of use, and further objectives and advantages thereof, will best be understood by reference to the following detailed description when read in conjunction with the accompanying drawings, wherein:

FIG. 1 is a longitudinal, cross-sectional view of a conventional steel mast for a rotorcraft;

FIG. 2 is a longitudinal, cross-sectional view of an illustrative embodiment of a composite-steel hybrid mast for a rotorcraft;

DETAILED DESCRIPTION

Figure 3:
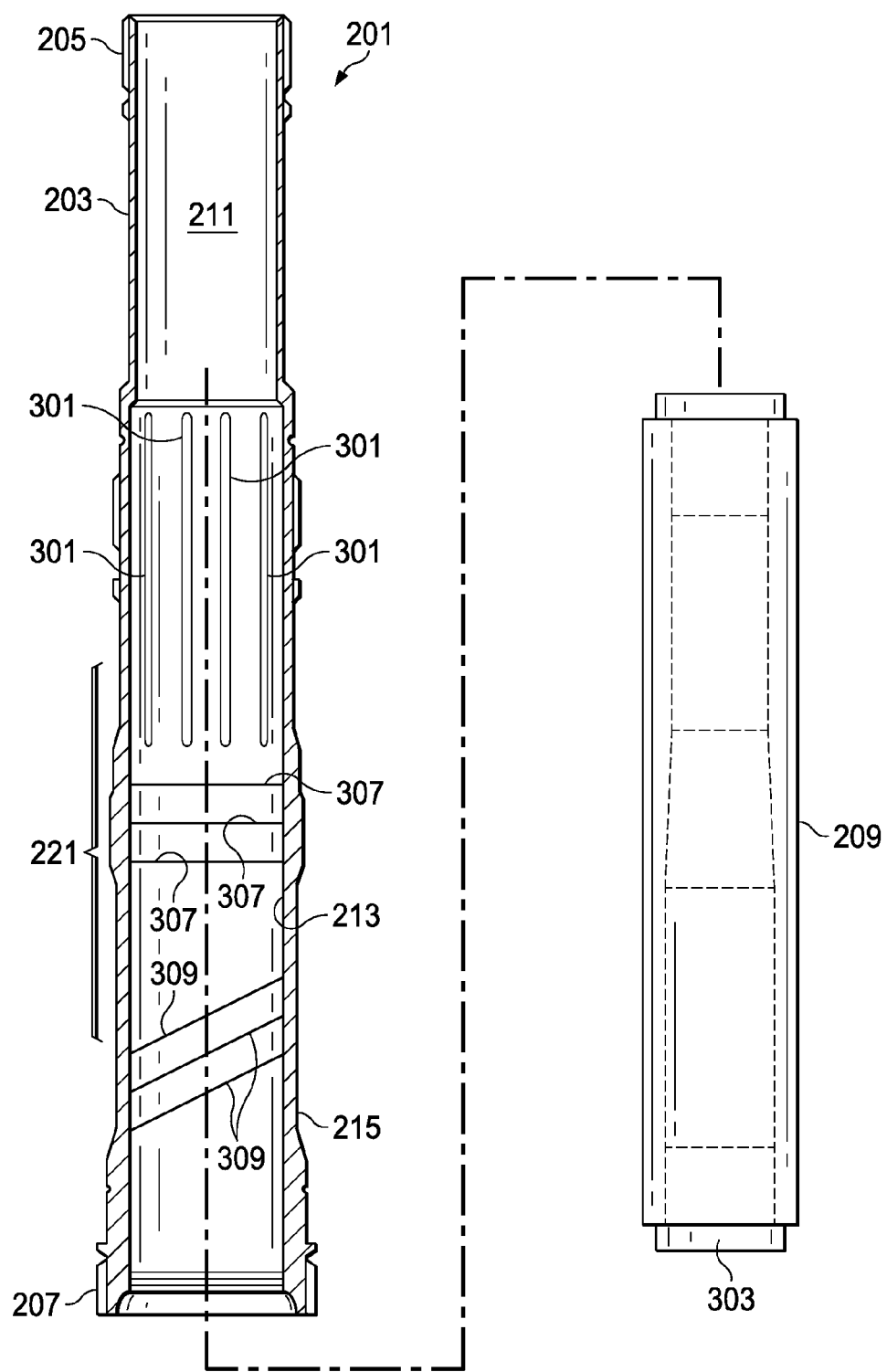
FIG. 3 depicts an example embodiment of a method for making a composite-steel hybrid mast.

Illustrative embodiments of the methods and apparatuses are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Conventionally, a method for making a composite-steel hybrid mast or shaft for a rotorcraft includes providing a tubular, steel member; preparing a composite member comprising a fiber-reinforced, polymeric, composite material on an expandable mandrel; and placing the expandable mandrel, with the composite member, into the internal surface of the steel member. The method further includes expanding the expandable mandrel, curing the composite member, unexpanding the expandable mandrel, and removing the expandable mandrel from the composite member. This conventional method is described, in detail, in U.S. Pat. No. 7,938,628, which is hereby incorporated by reference. It should be noted that the methods described herein for a mast can also apply to a driveshaft for a rotorcraft or automobile.

The conventional method of using an expandable mandrel to place the composite member into the steel member has several disadvantages. The first disadvantage to using an expandable mandrel may be that the inner diameter of the composite member must have a substantially uniform inner diameter because of design limitations of the expandable mandrel. The design limitation of the expandable mandrel significantly limits the end design of the composite member and increases weight.

Another disadvantage to using an expandable mandrel to place the composite member into the steel member may be a decreased radial pressure between the composite member and the steel member. For example, because the expansion of the steel member is limited by the cure temperature of the composite member, the composite member and the steel member may not experience a preferred radial pressure. In some examples, this reduced radial pressure does not induce a large enough interference fit between the composite member and the steel member.

Another disadvantage to using an expandable mandrel to place the composite member into the steel member may be that the composite member cannot be inspected after curing. For example, if there are gaps between the composite member and the steel member, these inconsistencies may go undetected because the mast cannot easily be non-destructively inspected once the composite member is within the steel member. There may also be voids, delamination, fiber distortion, marcels, or other defects within the composite member that would be undetectable. These gaps or defects between the composite member and the steel member may reduce the interface between the two members. The reduction of the interface between the two members may reduce the transfer of load between the composite member and the steel member and could increase the risk of failure.

Another disadvantage to using an expandable mandrel to place the composite member into the steel member may be that a multi-piece mast design may not be used. A multi-piece mast may be a mast that is made from several different pieces of metal and is split perpendicularly to the longitudinal axis. The different pieces may be the same type or grade of material, or the different pieces may be of different type or grade of material. When using an expandable mandrel, a multi-piece mast design may not be used because curing the composite material while it is within the steel can cause the resin to seep out of the seam between the different metal pieces.

Since there are several disadvantages to the method of using an expandable mandrel to place a composite member within a steel member of a mast, a new method for making a composite-steel hybrid mast for a rotorcraft is needed. Referring now to FIG. 2 in the drawings, one example of a composite-steel hybrid mast 201 for a rotorcraft is illustrated. Mast 201 can be an elongated coaxial, tubular structure having an external steel member 203. Steel member 203 of mast 201 can include one or more end fittings 205 and 207 that allow mast 201 to be connected to the transmission, the rotor hub, and other components of a rotorcraft (not shown).

Steel member 203 of mast 201 can include implementation specific external features, external shape, and external dimensions of a conventional steel mast, such as illustrated in FIG. 1. It should be noted that other types of metal can be used instead of steel, such as titanium. Additionally, mast 201 can be a multi-piece mast.

Mast 201 can include an interior composite member 209 that may be made of a fiber-reinforced, polymeric, composite material, such as a carbon-reinforced epoxy material, a non-epoxy resin system, an aramid fiber, a fiberglass-reinforced epoxy material, or a thermo-plastic resin system, to name a few. Interior composite member 209 may be formed of a fiber-reinforced, composite material fabricated with any process, including, for example, tape-placement, fiber-placement, filament-winding, braiding and resin transfer molding (RTM), hand layup, or the like. Composite member 209 can be disposed within a space 211 defined by steel member 203 and can be affixed to an internal surface 213 of steel member 203. Composite member 209 may be adhesively bonded to internal surface 213 of steel member 203. Internal surface 213 may include features, such as grooves or slots and/or surface treatments, such as grit blast, which improve adhesive bonding and load transfer between steel member 203 and composite member 209.

FIG. 3 depicts one embodiment of a method for making a composite-steel hybrid mast, such as mast 201. Referring in particular to FIG. 3, a fiber preform of the interior composite member 209 can be formed by a variety of ways. For example, by braiding or unidirectionally wrapping dry reinforcing fibers around a mandrel 303. Mandrel 303 can be a metallic mandrel with controlled external dimensions. Resin, such as an epoxy resin, can be dispersed in the fiber preform, such as by soaking the fiber preform in the resin. It should be noted that the present invention contemplates forming composite member 209 by methods other than resin transfer molding. For example, reinforcing fibers that are impregnated with resin, known as a composite "prepreg" material, may be placed or "laid-up" on mandrel 303. It should be noted that composite member 209 may have an outer diameter that is greater than the inner diameter of steel member 203.

In one example embodiment, composite member 209 may be formed by using a female tool, which may be a tubular structure. For example, composite material can be placed on an expandable mandrel, then the expandable mandrel with the composite material may be placed within the interior of the female tool. Next, the expandable mandrel may be expanded such that an outer portion of the composite material is pressed against the internal surface of the female tool. It should be noted that the internal surface of the female tool may have substantially the same shape as internal surface 213 of steel member 203. The internal diameter of the female tool may be larger than the internal diameter of the mast such that the outer diameter of composite member 209 is greater than the inner diameter of steel member 203.

Referring again to FIG. 3, mandrel 303 and composite member 209 can be heated to cure the resin of composite member 209 while composite member 209 is in contact with mandrel 303 to form a rigid composite member 209. Preferably, the curing operation occurs under a vacuum. It will be appreciated that specialized tools, such as an autoclave, an oven, a gas compressor, a vacuum pump, one or more material handling tools, or the like may be used to facilitate the operation and to complete the curing process. Also, it should be noted that there may be an increased design flexibility for the inner diameter of the composite member 209 if an expandable mandrel is not used.

In an example embodiment, a fiberglass layer is placed on top of composite member 209, prior to curing. The fiberglass layer can act as a sacrificial layer in order to machine the outside diameter of composite member 209 to precisely match the inner diameter of steel member 203. The fiberglass layer allows the machining of composite member 209, without machining into the load-carrying fibers of composite member 209.

After composite member 209 is cured, composite member 209 can be non-destructively inspected. There are several methods that composite member 209 may be inspected, including: acoustography, acousto-ultrasonic, air-coupled ultrasound, liquid-coupled ultrasound, radiography, and thermography. Additionally, composite member 209 can be inspected for surface deviations and other manufacturing defects. There are several methods of surface inspection, including the use of a white light scanner or a 3D laser scanner, to name a few.

Internal surface 213 of steel member 203 may be selectively treated by suitable processes, such as a mechanical process, to improve the adhesive bonding and load transfer between interior composite member 209 and exterior steel member 203. One example of a mechanical process is the machining of shallow slots or grooves, such as grooves 301, 307, and/or 309 in internal surface 213 of steel member 203, as shown in FIG. 3. It should be noted that grooves 301, 307, and 309 are merely examples of such grooves that can be defined by internal surface 213 of steel member 203 and that other surface textures, groove shapes and geometries exist. Moreover, it should be noted that grooves or slots, such as grooves 301, 307, and/or 309, of steel member 203 are not required. Additionally Internal surface 213 of composite member 209 may have corresponding shapes to fit within grooves 301, 307, and/or 309.

Once composite member 209 is cured, steel member 203 can be heated. Since steel has a positive coefficient of thermal expansion, the inside radius of steel member 203 increases. In one example embodiment, composite member 209 can be frozen in order to shrink composite member 209. After steel member 203 is heated, the inside radius may be large enough where composite member 209 may be inserted inside of steel member 203. Once composite member 209 is placed inside of steel member 203 and is in a desired position, the mast 201 can be cooled to room temperature.

It should be noted that the compression of steel member 203 onto composite member 209 at operational temperatures can inhibit or prevent composite member 209 from inadvertently becoming dislodged from steel member 203. In some embodiments, this compression may be sufficient to maintain a fixed spatial relationship between composite member 209 and internal surface 213 of steel member 203. For example, because the outer diameter of composite member 209 may be greater than the inner diameter of steel member 203, a interference fit may exist between composite member 209 and steel member 203. In some embodiments, however, composite member 209 may be bonded to internal surface 213 of steel member 203 by additional adhesive material.

In one example embodiment, adhesive may be added to at least a portion of the outer surface of composite member 209, prior to insertion into steel member 203, to increase the synergy of these two elements of mast 201. In order to reduce the likelihood that air will be trapped between composite member 209 and steel member 203, steel member 203 can be cooled from middle portion 221 of steel member 203. One method of cooling middle portion 221 may be to use liquid nitrogen to target middle portion 221. Since steel member 203 is cooled from middle portion 221, middle portion 221 is the first section of mast 201 to compress due to the cooling of steel member 203. This causes air to be pushed out from between steel member 203 and composite member 209 and decreases the probability of gaps between steel member 203 and composite member 209 caused by trapped air. It should be noted that steel member 203 may be cooled from middle portion 221 even if adhesive is not used.

Figure 4:
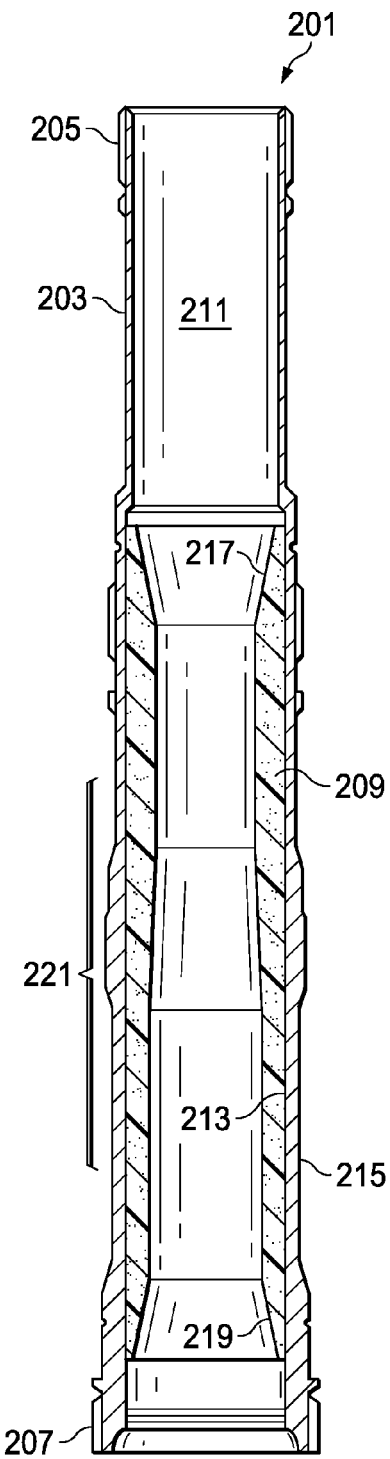
FIG. 4 is a longitudinal, cross-sectional view of an illustrative embodiment of a composite-steel hybrid mast for a rotorcraft, alternative to the embodiment of FIG. 2.
Figure 5:
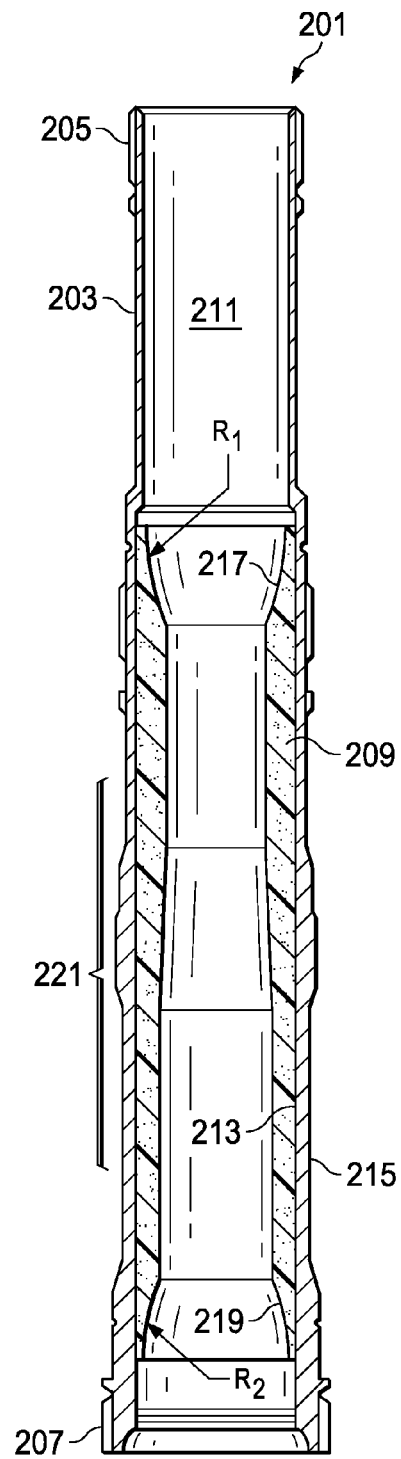
FIG. 5 is a longitudinal, cross-sectional view of an illustrative embodiment of a composite-steel hybrid mast for a rotorcraft, alternative to the embodiment of FIG. 2.

Referring now to the embodiment of FIG. 4, end surfaces 217 and 219 of composite member 209 are tapered. In one example, as shown in FIG. 5, end surfaces 217 and 219 are filleted, exhibiting a radius R1 or R2, respectively. If filleted or tapered end surfaces 217 and 219 are not produced by mandrel 303 and "molded in," filleted or tapered end surfaces 217 and 219 are machined at ends of composite member 209, if desired. Generally, filleted or tapered end surfaces 217 and 219 may alter the interface shear stress caused by torque transition from steel member 203 into composite member 209 and from composite member 209 into steel member 203 and provide a smooth torque transition. The optimal dimension of filleted or tapered end surfaces 217 and 219 may be implementation specific and preferably tailored through stress analysis. It should be noted, however, that filleted or tapered surfaces, such as surfaces 217 and 219, of composite member 209 are not required in every embodiment.

There are many advantages to composite-steel hybrid masts, such as mast 201. One advantage may be that composite-steel hybrid masts are more reliable and more durable than traditional steel masts since the composite member 209 and steel member 203 can create dual load paths. Both composite member 209 and steel member 203 may carry at least one of lift, thrust, torsion, and bending loads. The load distribution among composite member 209 and steel member 203 may be determined by the respective wall thicknesses and diameters. In one example, mast 201 can be designed such that composite member 209 alone can be capable of carrying design limit load which is the maximum obtainable load under a normal operating condition. Therefore, an unexpected crack growth or propagation in steel member 203 will not propagate into composite member 209 immediately, thus preventing catastrophic failure. This can be a 'fail-safe' feature of steel-composite hybrid masts.

Another advantage of composite-steel hybrid masts, such as mast 201, may be that the composite-steel hybrid mast may be lighter than a conventional steel mast. For example, composite member 209 allows the thickness of selected portions of steel member 203 to be reduced over conventional, all-steel masts, thereby reducing the overall weight of mast 201. Specifically, composite member 209 allows a thickness of a wall 215 of steel member 203 to be reduced in areas adjacent to composite member 209.

An advantage of the new method for making a composite-steel hybrid mast for a rotorcraft may be a greater radial pressure between composite member 209 and steel member 203. For example, in contrast to the conventional method, the expansion of steel member 203 may not be limited by the cure temperature of composite member 209. Therefore, steel member 203 may achieve a greater expansion in the new method. Additionally, composite member 209 may be frozen prior to insertion into steel member 203. Accordingly, after composite member 209 is inserted into steel member 203 and the mast is brought to room temperature, a greater radial pressure may exist between composite member 209 and steel member 203 in the new method in contrast to the conventional method.

The particular embodiments disclosed herein are illustrative only, as the method may be modified and practiced in different but equivalent manners apparent to those skilled in the art having the benefit of the teachings herein. Modifications, additions, or omissions may be made to the method described herein without departing from the scope of the invention.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method for making a composite-metal hybrid shaft for a rotorcraft, comprising:
   providing a tubular metal member that includes an internal surface defining a space therein;
   providing a curing tool;
   preparing a composite member by placing a plurality of composite layers onto the curing tool, wherein the plurality of composite layers consists of a carbon-reinforced epoxy material;
   placing a sacrificial fiberglass layer on the composite member, the fiberglass layer being an outer layer with respect to all layers of carbon-reinforced epoxy material;
   curing the composite member with the outer fiberglass layer, creating a cured composite member;
   expanding the metal member with heat, creating an expanded metal member;

placing the cured composite member completely into the space defined by the internal surface of the expanded metal member; and allowing the expanded metal member to cool;

wherein the cured composite member reinforces the composite-metal hybrid shaft.

2. The method of claim 1, wherein the metal member is steel.

3. The method of claim 1, wherein the internal surface of the metal member has a groove.

4. The method of claim 1, wherein the external surface of the metal member has a groove.

5. The method of claim 1, wherein preparing the composite member on the curing tool comprises braiding prepreg material around the curing tool.

6. The method of claim 1, wherein preparing the composite member on the curing tool comprises wrapping prepreg material around the curing tool.

7. The method of claim 1, wherein preparing the composite member on the curing tool comprises molding in at least one of a taper and a fillet at an end portion of the composite member.

8. The method of claim 1, further comprising machining the outer fiberglass layer, but not the composite member, to correspond to the internal surface of the metal member.

9. The method of claim 1, further comprising machining a taper on the composite member.

10. The method of claim 1, further comprising machining a fillet on the composite member.

11. The method of claim 1, wherein the method further comprises placing an adhesive onto the outer fiberglass layer.

12. The method of claim 1, wherein the method further comprises freezing the cured composite member prior to placing the cured composite member into the space defined by the internal surface of the expanded metal member.

13. The method of claim 1, wherein curing the composite member with the outer fiberglass layer occurs in an autoclave.

14. The method of claim 1, wherein curing the composite member with the outer fiberglass layer occurs outside of an autoclave.

15. The method of claim 1, wherein curing the composite member with the outer fiberglass layer occurs in a vacuum.

16. The method of claim 1, further comprising cooling a middle portion of the expanded metal member prior to cooling an end portion of the expanded metal member.

17. The method of claim 16, wherein a cooling fluid is used to cool the middle portion of the expanded metal member such that the middle portion of the expanded metal member is compressed onto the composite member prior to the end portion of the expanded metal member is compressed onto the composite member.

18. The method of claim 17, wherein the cooling fluid is liquid nitrogen.

19. The method of claim 1 wherein, the internal surface of the metal member includes a surface texture to improve load transfer between the cured composite member and the metal member.

20. The method of claim 8 wherein:

the internal surface of the metal member has at least one groove or slot, and machining the fiberglass layer includes machining a shape corresponding to the at least one groove or slot.

* * * * *